UNITED STATES PATENT OFFICE.

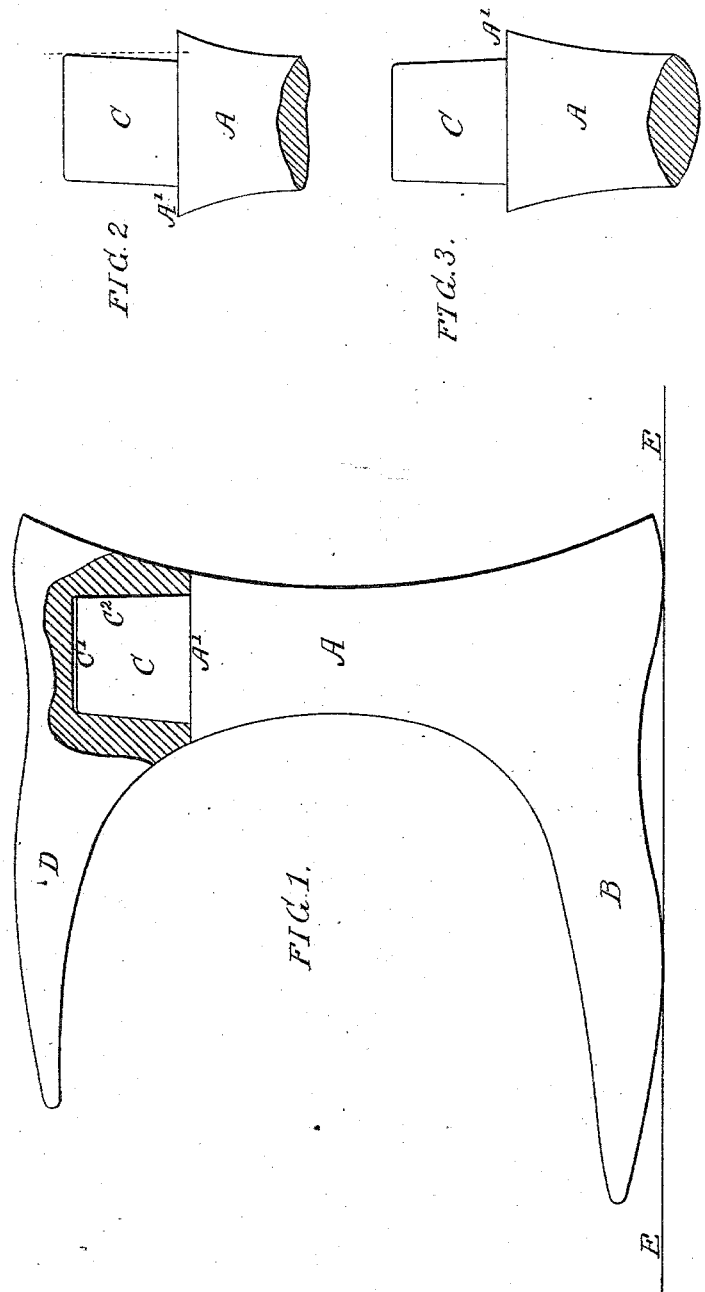

JOSEPH FIELDHOUSE, OF KEIGHLEY, COUNTY OF YORK, ENGLAND.

CHANGEABLE LAST.

SPECIFICATION forming part of Letters Patent No. 283,587, dated August 21, 1883.

Application filed March 12, 1883. (No model.) Patented in England July 23, 1881, No. 3,227.

*To all whom it may concern:*

Be it known that I, JOSEPH FIELDHOUSE, a subject of the Queen of Great Britain and Ireland, and residing at Keighley, in the county of York, England, have invented certain Improvements in the Construction of Changeable Lasts, (for which I have obtained Provisional Protection in Great Britain, No. 3,227, dated July 23, 1881,) of which the following is a specification.

My invention has for its object the construction of changeable lasts used for repairing boots, shoes, and other foot-coverings in such manner that any size of last can be firmly fitted to and easily removed from the stem or upright support of what I term the "base" last; and it consists in arranging one of the lasts, termed the "base" last, with a projecting stem at the top of which is a tenon so constructed that when inserted into the mortise formed in any of the changeable lasts the latter is secure, and will resist the force of the blows when nails or boot-protectors are being driven into the soles or heels of foot-coverings.

In the accompanying drawings, Figure 1 represents the side elevation of the base-last with a changeable last, which is partly in section, placed on the tenon at the top of the last-stem. Fig. 2 is a view of the upper portion of the stem, the tenon overhanging at the top; and Fig. 3 is a a view showing a taper tenon.

The stem A is part of the last B, which forms the base upon which the same stands when nails or protectors are being driven into foot-coverings. The stem-last B is the largest size, and when used for large foot-coverings the tenon is placed in the mortise of a changeable last, which last then forms the base, the last B being placed in the foot-covering.

At the top of the stem A is the before-mentioned tenon C, which is tapered, being narrower at the top part, C', than at the bottom, joining the shoulder A' of stem A. The back part of the tenon, at $C^2$, is perpendicular—that is, at right angles with the base-line E; or it may slightly overhang at the top, as shown by Fig. 2, the dotted line being perpendicular. On the tenon is placed a changeable last, D, the tenon passing into the mortise therein. The back part of tenon, at $C^2$, acting as a key in the mortise, prevents the last depressing at the toe part when nails or protectors are being driven into foot-coverings.

By making the tenon taper, as shown in Fig. 3, changeable lasts may be fitted to the stem A; but when so fitted are not so firm as when arranged in the manner as before described.

What I claim as my invention is—

The combination of a base-last having a stem, A, with a detachable last, D, adapted to be secured to the said stem by a mortise-and-tenon connection, substantially as set forth.

In testimony whereof I have signed my name to this specification in the presence of two subscribing witnesses.

JOSEPH FIELDHOUSE.

Witnesses:
W. G. GRINNELL,
T. PITTS.